(12) United States Patent  
Plathin (10) Patent No.: US 9,676,595 B2  
(45) Date of Patent: Jun. 13, 2017

(54) METHOD AND ELEVATOR ARRANGEMENT

(71) Applicant: KONE CORPORATION, Helsinki (FI)

(72) Inventor: Antti Plathin, Vantaa (FI)

(73) Assignee: KONE CORPORATION, Helsinki (FI)

( * ) Notice: Subject to any disclaimer, the term of this patent is extended or adjusted under 35 U.S.C. 154(b) by 541 days.

(21) Appl. No.: 13/678,774

(22) Filed: Nov. 16, 2012

(65) Prior Publication Data

US 2013/0118838 A1    May 16, 2013

Related U.S. Application Data

(63) Continuation of application No. PCT/FI2011/000028, filed on May 26, 2011.

(30) Foreign Application Priority Data

May 28, 2010  (FI) ...................................... 20100223  
Jun. 18, 2010  (FI) ...................................... 20100257

(51) Int. Cl.
*B66B 11/08* (2006.01)  
*B66B 7/02* (2006.01)  
(Continued)

(52) U.S. Cl.
CPC .............. *B66B 11/00* (2013.01); *B23P 17/00* (2013.01); *B66B 19/00* (2013.01); *B66B 19/02* (2013.01);  
(Continued)

(58) Field of Classification Search
CPC ......... B66B 7/023; B66B 7/024; B66B 7/025; B66B 19/00; B66B 19/002; B66B 19/005; B23P 17/00  
(Continued)

(56) References Cited

U.S. PATENT DOCUMENTS 5,033,586 A  *  7/1991  Richards et al. .............. 187/259  
5,553,686 A  *  9/1996  Jensen .......................... 187/408  
(Continued)

FOREIGN PATENT DOCUMENTS

EP      1555233 A1  *  7/2005  ............... B66B 7/06  
JP      S57-042483 A     3/1982  
(Continued)

OTHER PUBLICATIONS

FLS, Inc., Translation, Elevator Installation Method, JP 03264482 A, Aug. 2012, pp. 1-13.*

(Continued)

*Primary Examiner* — William A Rivera  
*Assistant Examiner* — Stefan Kruer  
(74) *Attorney, Agent, or Firm* — Birch, Stewart, Kolasch & Birch, LLP (57) ABSTRACT

A method of manufacturing an elevator includes installing a movable supporting platform and an elevator car in the elevator hoistway; taking the elevator car into use to serve passengers and/or to transport goods; removing the elevator car from use; changing the service range of the elevator car to reach higher up in the elevator hoistway by lifting the supporting platform higher up in the elevator hoistway; and taking the elevator car back into use. The elevator is reeved to include construction-time hoisting roping, which includes one or more ropes, the longitudinal power transmission capacity of which is based at least essentially on non-metallic fibers in the longitudinal direction of the rope. In the method, guide rails to be fixed with guide rail brackets can additionally be installed by the aid of an installation device. An elevator arrangement can be used to perform the method.

21 Claims, 3 Drawing Sheets

(51) Int. Cl.
*B66B 7/06* (2006.01)
*B66B 19/00* (2006.01)
*B23P 17/00* (2006.01)
*D07B 1/02* (2006.01)
*D07B 1/04* (2006.01)
*B66B 11/00* (2006.01)
*B66B 19/02* (2006.01)
*D07B 1/16* (2006.01)
*D07B 1/22* (2006.01)

(52) U.S. Cl.
CPC ............... *D07B 1/02* (2013.01); *D07B 1/04* (2013.01); *B66B 19/002* (2013.01); *B66B 19/005* (2013.01); *D07B 2201/104* (2013.01); *D07B 2201/1096* (2013.01); *D07B 2201/2033* (2013.01); *D07B 2201/2046* (2013.01); *D07B 2205/205* (2013.01); *D07B 2205/206* (2013.01); *D07B 2205/2014* (2013.01); *D07B 2205/2039* (2013.01); *D07B 2205/2096* (2013.01); *D07B 2205/3003* (2013.01); *D07B 2205/3007* (2013.01); *D07B 2501/2007* (2013.01); *Y10T 29/49716* (2015.01)

(58) Field of Classification Search
USPC ........................................................ 187/408
See application file for complete search history.

(56) References Cited

U.S. PATENT DOCUMENTS

| | | | |
|---|---|---|---|
| 6,305,615 B1 * | 10/2001 | Traktovenko | 238/315 |
| 7,261,184 B2 * | 8/2007 | Bass et al. | 187/242 |
| 2005/0150728 A1 | 7/2005 | Van Der Meijden et al. | |
| 2007/0170014 A1 * | 7/2007 | Woronoff | 187/414 |
| 2012/0312640 A1 * | 12/2012 | Bjorni et al. | 187/408 |

FOREIGN PATENT DOCUMENTS

| | | | | |
|---|---|---|---|---|
| JP | 03264482 A | * | 11/1991 | B66B 7/00 |
| JP | 05186159 A | * | 7/1993 | B66B 7/00 |
| JP | 07257854 A | * | 10/1995 | B66B 7/00 |
| WO | WO 0007923 A1 | * | 2/2000 | B66B 19/00 |
| WO | 2004/050526 A1 | | 6/2004 | |
| WO | WO 2005030630 A1 | * | 4/2005 | B66B 19/002 |
| WO | 2009/034224 A1 | | 3/2009 | |
| WO | 2009/090299 A1 | | 7/2009 | |
| WO | WO 2009092844 A1 | * | 7/2009 | B66B 19/00 |
| WO | WO 2011148033 A1 | * | 12/2011 | B66B 19/02 |

OTHER PUBLICATIONS

AIPN, Machine Translation, JP 07-257854 A, Abe et al, May 24, 2016, pp. 1-5.*

* cited by examiner

METHOD AND ELEVATOR ARRANGEMENT

This application is a Continuation of PCT International Application No. PCT/FI2011/000028 filed on May 26, 2011, which claims priority to Patent Application No. 20100223 filed in Finland on May 28, 2010 and Patent Application No. 20100257 filed in Finland on Jun. 18, 2010, all of which are hereby expressly incorporated by reference into the present application.

FIELD OF THE INVENTION

The object of the invention is a method in the manufacture of an elevator and an elevator arrangement, which elevator is preferably an elevator to be installed in a building and applicable to passenger transport and/or freight transport, and in which method and in which elevator arrangement the elevator is/can be taken into service use already during its construction-time.

BACKGROUND OF THE INVENTION

In connection with so-called jump-lifts, the elevator hoistway is taken into use already before the full length of the elevator hoistway has been completed. The top part of the elevator hoistway is constructed at the same time as an elevator car moving in the already completed bottom part of the elevator hoistway serves people on the lower floors of the building. In jump-lifts, the elevator car moving in the bottom part of the elevator hoistway is supported and moved during the construction-time use suspended on hoisting ropes that are supported by a supporting platform in the elevator hoistway, which ropes are moved with a hoisting machine that is usually supported on the supporting platform. Installation work is done in the parts of the elevator hoistway above this supporting platform. When the part of the elevator hoistway under construction above the supporting platform has reached a sufficient stage of completion, the completed part of the elevator hoistway can be taken into use. In this case a jump-lift is performed, wherein the supporting platform is lifted to a higher position in the elevator hoistway, thus extending the operating area of the elevator car upwards. A worksite crane in use in the construction of the building can, for example, be used for the lifting. Alternatively it has been possible to move the machine room platform that is being supported in the lifting on a support structure in the hoistway above the machine room platform. When the elevator hoistway has reached its final height, the machine room platform has usually been removed from the elevator hoistway and the final hoisting machine of the elevator has been brought into a machine room built at the end of the elevator hoistway. As a conclusion to the installation method the construction-time roping is removed and the elevator is reeved again with the final roping. Elevator rope technology that has been established for a long time has been used in jump-lifts. Thus, conventional spiral metal ropes, i.e. ropes with a longitudinal power transmission capability based essentially on metal fibers, have been used as construction-time ropes. These metal ropes are cheap in price and perform their construction-time tasks well, being simple and durable in their fixings, and they withstand worksite conditions without problems. The replacement of ropes that have served for a short while with new ropes as a conclusion to the method has been economical because metal ropes are inexpensive.

A problem in prior-art solutions has been that the hoisting arrangements needed for lifting the supporting platform take up a lot of space, are complex and are not sufficiently quick to use. More particularly the support points needed for moving and positioning the machine room platform are difficult to arrange. It would not be desirable to separately arrange numerous support points in a building. It has been noticed that the difficulty of finding support points that are sufficiently stable and durable effectively limits the maximum height to which a jump-lift can, with a reasonable work input, reach. A worksite crane must sometimes be used for moving the machine room platform, because the aforementioned problems make other solutions so awkward. Another problem has been, generally speaking, the demanding installation environment, which has set numerous practical challenges, which are connected to the smooth-running and safety of the installation and to the durability of structures. These are, inter alia, the space usage and complexity of the hoisting arrangement of the machine room platform, the center of mass and stability of the machine room platform during the lifting and while being in position, the center of mass and stability of the support arrangement to be used for the lifting during the lifting and while being in position, the setting of the support locking mechanism producing a suitable balance, the cramped layout of the machine room platform, suitable hoisting devices, the dimensioning of the hoisting machine for the final travel height, routing of the ropes with adequate run clearances, correct fitting of the rope length, the need for safe and spacious working space. These numerous variables that must be taken into account affect each other directly or indirectly and their overall effect is that the structure easily becomes complex and robust, and requires a lot of space.

AIM OF THE INVENTION

The aim of the invention is to produce an improved method in the manufacture of an elevator and an improved construction-time elevator arrangement. One aim of the invention, among others, is to eliminate the aforementioned drawbacks of prior-art solutions. With the solution according to the invention, it is possible to directly or indirectly affect numerous problems of jump-lifts in a simplifying way. Primarily with the solution the aim is to facilitate the supporting of the supports of a jump-lift, more particularly those supports in the elevator hoistway. The aim of the invention is further to produce one or more of the following advantages, among others:

A method and arrangement are achieved with which elevators with significantly higher travel heights than before can be manufactured with jump-lifts.

A method and arrangement are achieved which reduce the properties required of the structure of a support point, for achieving stable and safe supporting.

A method and arrangement are achieved which enable the formation of the support structures of the supporting platform to be significantly simpler and lighter than before.

A method and arrangement are achieved which enable freer selection of the support point of the supporting platform than before.

A method and arrangement are achieved which enable freer selection of the support point of the support structure to be arranged for the lifting of the supporting platform than before.

A method and arrangement are achieved which enable freer placement of the rope supply than before.

A method and arrangement are achieved in which hoisting devices of lighter structure than earlier can be used for the manufacture of an elevator, more particularly for lifting the supporting platform.

A method and arrangement are achieved in which the total mass to be transferred upwards in a jump-lift is smaller than earlier, the advantages of which are, among others, improved safety, apparatuses can be dimensioned to be lighter, increased freedom in the implementation of the hoisting arrangement, et cetera.

A safer method and arrangement than before are achieved.

A method and arrangement are achieved which use space more efficiently than before.

A method and arrangement are achieved with which a long jump-lift is easier and faster to implement than earlier.

A method and arrangement are achieved with which a construction-time elevator is simple to convert into the final elevator.

SUMMARY OF THE INVENTION

The invention is based on the concept that the construction-time supporting/lifting function of the elevator is formed to be lighter than before, in which case the support points can be selected significantly more freely than before, and the arrangement lifting the supporting platform and the supporting platform structure can be simplified. Additionally, making the supporting sufficiently stable and durable is facilitated. According to the concept of the invention the weight of the supporting/lifting function of the elevator car is formed to be lighter than before by lightening the mass of the roping supported by the supporting platform. This is achieved when the hoisting roping is formed to comprise a rope/ropes, the power transmission capability of which is/are based at least essentially, or even wholly, on non-metallic fibers, which are longitudinal to the rope.

In a basic embodiment of the concept according to the invention in the method in the manufacture of an elevator at least the following procedures are performed, a movable supporting platform and an elevator car are installed in the elevator hoistway, a rope installation is performed, in which the elevator is reeved to comprise construction-time hoisting roping, and the hoisting roping is arranged to support the car resting on the supporting platform supported in its position above the car, the elevator car is taken into use to serve passengers and/or to transport goods, the elevator car is removed from the aforementioned use, the service range of the elevator car is changed to reach higher up in the elevator hoistway by lifting the supporting platform higher up in the elevator hoistway.

In the aforementioned rope installation the elevator is reeved to comprise construction-time hoisting roping, which comprises one or more ropes, the longitudinal power transmission capability of which ropes is based at least essentially, preferably wholly, at least essentially on non-metallic fibers in the longitudinal direction of the rope. In this way, one or more of the aforementioned advantages are achieved.

Preferably in the method when lifting the supporting platform it is lifted taking vertical support force from the guide rails of the elevator, and/or after the lifting of the supporting platform it is supported in its position in the elevator hoistway by locking it in the vertical direction to be supported by the guide rails. In this way vertical supporting can be performed simply also in high-rise elevators. Independence from the height of the edifice is less than before.

In a more refined embodiment of the concept according to the invention the service range of the elevator car is changed to reach higher up in the elevator hoistway by moving the supporting platform higher up in the elevator hoistway and by supplying more rope to the hoisting roping from the rope supply storage. In this way a smooth increase in rope length is enabled for the increased travel height.

In a more refined embodiment of the concept according to the invention in the method the supporting platform is lifted taking vertical support force from the guide rails of the elevator that extend to above the supporting platform, such as from the guide rails of the car and/or of the counterweight, in which case preferably at least most of, preferably essentially all, the vertical support force needed for lifting is taken from the aforementioned guide rails. In this way the supporting for the lifting can be simply performed. The structure of the support arrangement of the lifting can be kept simple and light, when structures already fixed into the elevator hoistway can be used. More particularly with roping of the type mentioned this is advantageous because in this way the weight of the lifting function to be supported on the guide rail is not sufficient to damage the guide rail.

In a more refined embodiment of the concept according to the invention in the method the supporting platform is lifted taking vertical support force from the support arrangement that is above the supporting platform and supported in its position in the elevator hoistway. In this way a climbing solution is achieved in the elevator hoistway. More particularly with roping of the type mentioned this is advantageous because in this way the maximum height of climbing increases significantly without problems in finding support points.

In a more refined embodiment of the concept according to the invention in the rope installation the elevator is reeved to comprise construction-time hoisting roping, which comprises one or more ropes, which continue(s) via a fixing/fixings to the rope supply storage, which rope supply storage comprises a length of rope required by at least one, preferably a plurality of, jump-lifts. In this way a smooth increase in rope length is enabled for the increasing travel height.

In a more refined embodiment of the concept according to the invention the service range of the elevator car is changed to reach higher up in the elevator hoistway, thus increasing the service range. Thus the service range of the elevator car is changed only at its top end and the lowermost position remains essentially at the same level.

In a more refined embodiment of the concept according to the invention the aforementioned rope supply storage is in connection with the elevator car. More particularly with roping of the type mentioned this is advantageous because the extra load caused by the mass of the stored rope in connection with the elevator car is small.

In a more refined embodiment of the concept according to the invention the aforementioned rope supply storage is in connection with the aforementioned supporting platform. More particularly with roping of the type mentioned this is advantageous because the extra load caused by the mass of the stored rope on the supporting platform is small.

In a more refined embodiment of the concept according to the invention in the aforementioned rope installation the elevator is reeved such that the hoisting roping supports the elevator car and the counterweight with a 1:1 lifting ratio. In this way the rope supply is easy to arrange from the elevator car side.

In a more refined embodiment of the concept according to the invention in the aforementioned rope installation the elevator is reeved such that the hoisting roping supports the counterweight with a 2:1 lifting ratio and the elevator car with a 1:1 lifting ratio. In this way the rope supply is easy to arrange from the counterweight side.

In a more refined embodiment of the concept according to the invention in the aforementioned rope installation the elevator is reeved such that the hoisting roping supports the elevator car with a 2:1 lifting ratio and the counterweight with a 2:1 lifting ratio. Thus the rope supply location can be more freely selected to be that desired.

In a more refined embodiment of the concept according to the invention in the method after the lifting of the supporting platform the supporting platform is supported in its position in the elevator hoistway by locking it in the vertical direction to be supported by the guide rails of the car and/or of the counterweight and/or to be supported by the guide rail brackets of said guide rails. Thus the supporting platform does not necessarily need to be supported on the concrete parts or corresponding of the building.

In a more refined embodiment of the concept according to the invention as a conclusion of the method the construction-time elevator is converted into the final elevator, in which final elevator the construction-time hoisting roping forms the final hoisting roping of the elevator.

In a more refined embodiment of the concept according to the invention as a conclusion of the method the construction-time elevator is converted into the final elevator by arranging the hoisting roping to support the elevator car and the counterweight with a 1:1 lifting ratio.

In a more refined embodiment of the concept according to the invention in the method the supporting platform is lifted taking vertical support force from the guide rails of the elevator that extend to above the supporting platform, which guide rails are on opposite sides of the car.

In a more refined embodiment of the concept according to the invention in the method the supporting platform is lifted with a hoist, which is in connection with the supporting platform. Thus the climbing structure is simple and safe to implement.

In a more refined embodiment of the concept according to the invention before the lifting of the supporting platform the first support arrangement is supported on the top end of the guide rail section of the first guide rail line on the side of the elevator car and the second support arrangement is supported on the top end of the guide rail section of the second guide rail line on the opposite side of the elevator car, which top ends extend essentially to above the supporting platform, and that in the lifting the supporting platform is pulled with one or more hoists to higher up in the elevator hoistway taking the vertical support force needed for the lifting from the guide rails with the aforementioned support arrangements.

In a more refined embodiment of the concept according to the invention the service height of the elevator car is repeatedly increased with a plurality of jump-lifts, in which the supporting platform is moved higher up in the elevator hoistway, after each aforementioned jump-lift taking the elevator car into use to serve passengers and/or to transport goods, and when the plurality of jump-lifts has been performed additional installations and/or modifications are performed, with which the construction-time elevator is converted into the final elevator. In this way the elevator car can be kept in use for most of the construction time.

In a basic embodiment of the concept according to the invention the elevator arrangement comprises an elevator hoistway, an elevator car, hoisting roping for supporting and moving the elevator car in the elevator hoistway, a hoisting machine for moving the hoisting ropes, a movable supporting platform for supporting the elevator car below it in the elevator hoistway via hoisting roping. The elevator arrangement, preferably a supporting platform, also comprises means for the vertical supporting of the supporting platform in its position in the elevator hoistway, which means can be moved between a space supporting the supporting platform (supported on the elevator hoistway or on a structure, such as a guide rail, installed in the elevator hoistway) in its position in the vertical direction and a space not supporting the supporting platform (supported on the elevator hoistway or on a structure, such as a guide rail, installed in the elevator hoistway) in the vertical direction, and means for lifting the supporting platform higher up in the elevator hoistway. The hoisting roping comprises one or more ropes, the longitudinal power transmission capability of which ropes is based at least essentially, preferably wholly, on non-metallic fibers in the longitudinal direction of the rope. In this way the aforementioned advantages are achieved.

Preferably in the arrangement when lifting the supporting platform the vertical support force is arranged to be taken from the guide rails of the elevator of the supporting platform, and/or after the lifting of the supporting platform the supporting platform is arranged to be supported in its position in the elevator hoistway by locking it in the vertical direction to be supported by the guide rails. In this way vertical supporting can be performed simply also in high-rise elevators.

In a more refined embodiment of the concept according to the invention in the method/elevator arrangement the rope comprises a power transmission part or a plurality of power transmission parts, for transmitting force in the longitudinal direction of the rope, which power transmission part is essentially fully of non-metallic material. In this way power transmission is arranged lightly.

In a more refined embodiment of the concept according to the invention in the method/elevator arrangement the means for lifting the supporting platform higher up in the elevator hoistway comprise a movable support arrangement (21,22) supported in its position in the elevator hoistway above the supporting platform, taking vertical support force from which support arrangement the supporting platform is arranged to be lifted. The support arrangement comprises means for vertically supporting the support arrangement in its position in the elevator hoistway (e.g. means for locking the support arrangement to a guide rail or to some other structure so as to be essentially immobile), which means can be preferably moved between a space supporting the support arrangement in its position in the elevator hoistway and a space not supporting the support arrangement in its position in the elevator hoistway. In this way it can be moved, e.g. along with the working platform, to higher up in the elevator hoistway.

In a more refined embodiment of the concept according to the invention in the method/elevator arrangement the rope comprises a power transmission part or a plurality of power transmission parts, for transmitting force in the longitudinal direction of the rope, which power transmission part comprises the aforementioned non-metallic fibers in the longitudinal direction of the rope.

In a more refined embodiment of the concept according to the invention in the method/elevator arrangement the aforementioned power transmission part or plurality of power transmission parts continues from the elevator car at least to the supporting platform and the rope is arranged to transmit with the aforementioned power transmission part or plurality of power transmission parts the longitudinal force of the rope from the supporting platform to the elevator car for supporting the elevator car.

In a more refined embodiment of the concept according to the invention in the method/elevator arrangement the aforementioned power transmission part or plurality of power transmission parts continues from the elevator car to at least the traction sheave and the rope is arranged to transmit with the aforementioned power transmission part or plurality of power transmission parts the longitudinal force of the rope from the traction sheave to the elevator car for supporting and moving the elevator car.

In a more refined embodiment of the concept according to the invention in the method/elevator arrangement essentially all the power transmission parts of the rope for transmitting force in the longitudinal direction of the rope are essentially fully of non-metallic material.

In a more refined embodiment of the concept according to the invention in the method/elevator arrangement each aforementioned power transmission part is of a material which comprises non-metallic fibers in essentially the longitudinal direction of the rope.

In a more refined embodiment of the concept according to the invention in the method/elevator arrangement the rope passes around the traction sheave, bending at the point of it around an axis that is in the width direction of the rope, and that the width of the rope is greater than the thickness.

In a more refined embodiment of the concept according to the invention in the method/elevator arrangement the material of the aforementioned power transmission part is a composite material, which comprises non-metallic fibers as reinforcing fibers in a polymer matrix. The matrix in this case binds the individual fibers of the power transmission part to each other. The structure is light, strong and durable. The rope is in this case also very light and the amount of rope needed is small. The rope is in this case preferably belt-shaped for improving the bending properties.

In a more refined embodiment of the concept according to the invention in the method/elevator arrangement the aforementioned non-metallic fibers are carbon fibers or glass fibers or Aramid fibers or polybenzoxazole fibers or UHM-WPE fibers or corresponding. Thus the hoisting roping is light.

In a more refined embodiment of the concept according to the invention in the method/elevator arrangement the aforementioned non-metallic fibers are synthetic fibers.

In a more refined embodiment of the concept according to the invention in the method/elevator arrangement the material of the aforementioned non-metallic fibers is essentially lighter than steel.

In a more refined embodiment of the concept according to the invention in the method/elevator arrangement the rope comprises a power transmission part or a plurality of power transmission parts, for transmitting force in the longitudinal direction of the rope, which power transmission part comprises one or more strands braided from the aforementioned non-metallic fibers, preferably from Aramid fibers. These power transmission parts can, in turn, be further braided e.g. around a center rope or corresponding. In this case the power transmission parts are simple to manufacture.

In a more refined embodiment of the concept according to the invention in the method, parts of the supporting platform, more particularly its support structure, is used for forming the structure supporting the machinery of the final machine room of the elevator, which supporting platform has earlier been in its position in a position disposed lower in the elevator hoistway, and which supporting platform was used in the aforementioned lower disposed position for supporting the machinery comprising the traction sheave. In this way the manufacture of the elevator is, among other things, speeded up.

In a more refined embodiment of the concept according to the invention in the method/elevator arrangement the platform is lifted through from the aperture of the space that is an extension of the elevator hoistway and is reserved for the final machine room, after which the platform is lowered to rest on the load-bearing structures of the building, preferably to rest on the top surfaces comprised in the load-bearing structures, possibly using support beams and/or the support means (t) of the supporting platform. Thus the structure can be positioned safely and even permanently.

In a more refined embodiment of the concept according to the invention in the method/elevator arrangement the supporting platform is lifted through from the aperture of the space reserved for the final machine room with a hoist (e.g. the hoist 9) supported by a structure of the space reserved for the final machine room. Thus a simple lifting sufficiently upwards is made possible. This is advantageous when the hoisting roping is of the type presented, because finding a support point in this way is easy.

In a more refined embodiment of the concept according to the invention in the method/elevator arrangement the density of the aforementioned fibers is less than 4000 kg/m3, and the strength is over 1500 N/mm2, more preferably so that the density of the aforementioned fibers is less than 4000 kg/m3, and the strength is over 2500 N/mm2, most preferably so that the density of the aforementioned fibers is less than 3000 kg/m3, and the strength is over 3000 N/mm2. One advantage is that, firstly, the fibers themselves are light, and, secondly, not many of them are needed because they are strong.

In a more refined embodiment of the concept according to the invention in the method/elevator arrangement between jump-lifts the installation work of the elevator is performed from a movable working platform above the supporting platform, and that the support arrangement is lifted along with the working platform to the level of its support point, and the support arrangement is supported in the vertical direction in its position in the elevator hoistway, and that the supporting platform is lifted taking vertical support force with the support arrangement from the structure on which the support arrangement is supported. Thus moving the support arrangement is simple. This is advantageous in connection with hoisting roping of the aforementioned type, because the structure of the support arrangement is in this case easily movable.

In a more refined embodiment of the concept according to the invention in the method/elevator arrangement the aforementioned guide rails comprise a guide rail line/guide rail lines, each of which guide rail lines comprises a plurality of guide rail sections one on top of the other, each guide rail section of which plurality is supported on the building with one or more guide rail brackets, which aforementioned one guide rail bracket, or the aforementioned more than one guide rail bracket together, is/are arranged to exert upwardly-directed support force on the guide rail section fixed by it for supporting the guide rail section fixed by it, which force is preferably in its magnitude at least most of the weight of the guide rail section, more preferably essentially the amount of, or even greater than the amount of, the weight of the guide rail section. In this way extension of the travel height of an elevator is enabled to be very high.

In a more refined embodiment of the concept according to the invention in the method/elevator arrangement the travel height of the elevator is arranged/has been arranged with jump-lifts to be 250 m or over, preferably 400 m or over, preferably up to 500 m or over.

In a more refined embodiment of the concept according to the invention in the method/elevator arrangement the elevator is reeved/has been reeved to comprise roping connecting the counterweight and the elevator car (tie-down roping), which roping passes below a diverting pulley fixed to the bottom part of the elevator hoistway, and which roping comprises one or more ropes, the longitudinal power transmission capability of which ropes is based at least essentially, preferably wholly, on non-metallic fibers (F,F') in the longitudinal direction of the rope. The structure of this type of rope can be any whatsoever of those presented/defined above, or elsewhere in this application, and can be slightly different in structure than in the hoisting roping. Each aforementioned rope preferably continues via a fixing/fixings, which can be opened, to the rope supply storage which rope supply storage comprises a length of rope required by at least one, preferably a plurality of, jump-lifts. An advantage is that the counterweight is not able to jump in car braking.

In a more refined embodiment of the concept according to the invention the width/thickness of the rope is at least 2 or more, preferably at least 4, even more preferably at least 5 or more, yet even more preferably at least 6, yet even more preferably at least 7 or more, yet even more preferably at least 8 or more, most preferably of all more than 10. In this way good power transmission capability is achieved with a small bending radius. This can be implemented preferably with a composite material presented in this patent application, which material has a very advantageously large width/thickness ratio owing to its rigidity.

In a more refined embodiment of the concept according to the invention the aforementioned power transmission part or a plurality of power transmission parts covers over 40% of the surface area of the cross-section of the rope, preferably 50% or over, even more preferably 60% or over, even more preferably 65% or over. In this way a large part of the cross-sectional area of the rope can be formed to be load bearing. This can be implemented particularly well with the composite presented in this patent application.

In a more refined embodiment of the concept according to the invention the module of elasticity of the polymer matrix is over 2 GPa, most preferably over 2.5 GPa, yet more preferably in the range 2.5-10 GPa, most preferably of all in the range 2.5-3.5 GPa. In this way a structure is achieved wherein the matrix essentially supports the reinforcing fibers. One advantage, among others, is a longer service life.

Alongside the invention presented above, a second invention is also disclosed, which second invention is based on the concept that the guide rails of an elevator are used for the vertical support of the supporting platform in the lifting and/or supporting in position of said platform, in which case in the invention the guide rail sections comprised in a guide rail line are supported essentially with guide rail brackets. In this way the lifting and/or supporting of a jump-lift can be formed simply by means of the guide rails, because the solution does not require the supporting platform to be directly supported on the building. At the same time, however, the travel height can be increased to reach very high because in the solution the dead weight of the guide rail line together with the weight of the arrangements supported on it does not rise to be so great that the guide rail line would bend into a curve at the moment of lifting the supporting platform and/or when the supporting platform is supported in its position resting on the guide rails. The solution is simple and independent of the height of the construction, more particularly of the height of the guide rail line. In this way the problem noticed in prior art can be solved, said problem being that the support point of the supporting platform must be taken from the building with awkward arrangements if the building is tall. In the highermost liftings a load problem has been noticed in the guide rails, because in a jump-lift with a high travel height the lowermost guide rail sections have supported both the guide rails above them and the supporting platform supported resting on them.

In this basic embodiment of a second concept according to the invention in the method in the manufacture of an elevator at least the following procedures are performed,
  a movable supporting platform and an elevator car are installed in the elevator hoistway,
  a rope installation is performed, in which the elevator is reeved to comprise construction-time hoisting roping, and the hoisting roping is arranged to support the elevator car resting on the supporting platform supported in its position above the elevator car,
  the elevator car is taken into use to serve passengers and/or to transport goods,
  the elevator car is removed from the aforementioned use,
  the service range of the elevator car is changed to reach higher up in the elevator hoistway by lifting the supporting platform higher up in the elevator hoistway,
  the elevator car is taken back into the aforementioned use,
and in the method when lifting the supporting platform it is lifted taking vertical support force (support reaction) from the guide rails of the elevator, and/or after the lifting of the supporting platform it is supported in its position in the elevator hoistway by locking it in the vertical direction to be supported by the guide rails. The aforementioned guide rails comprise a guide rail line/guide rail lines, each of which guide rail lines comprises a plurality of guide rail sections one on top of the other, each guide rail section of which plurality is supported on the building with one or more guide rail brackets, which aforementioned one guide rail bracket, or the aforementioned more than one guide rail bracket together, is/are arranged to exert upwardly-directed support force on the guide rail section fixed by it for supporting the guide rail section fixed by it, which force is preferably in its magnitude at least most of the weight of the guide rail section, more preferably essentially the amount of, or even greater than the amount of, the weight of the guide rail section.

In a basic embodiment of a second concept according to the invention, the elevator arrangement comprise
  an elevator hoistway,
  an elevator car,
  guide rails, such as the guide rails of the elevator car and/or of a possible counterweight,
  hoisting roping for supporting and moving the elevator car in the elevator hoistway,
  a hoisting machine for moving the hoisting ropes,
  a movable supporting platform for supporting the elevator car below it in the elevator hoistway via hoisting roping,
  means for lifting the supporting platform higher up in the elevator hoistway,
  means for vertically supporting the supporting platform in its position in the elevator hoistway,
in which arrangement when lifting the supporting platform the vertical support force is arranged to be taken from the guide rails of the elevator, and/or after the lifting of the supporting platform the supporting platform is arranged to be supported in its position in the elevator hoistway by locking it in the vertical direction to be supported by the guide rails. The aforementioned guide rails comprise a guide rail line/guide rail lines, each of which guide rail lines comprises a plurality of guide rail sections one on top of the other, each guide rail section of which plurality is supported on the building with one or more guide rail brackets, which aforementioned one guide rail bracket, or the aforementioned more than one guide rail bracket together, is/are arranged to exert upwardly-directed support force on the guide rail section fixed by it for supporting the guide rail section fixed by it, which force is preferably in its magnitude at least most of the weight of the guide rail section, more preferably essentially the amount of, or even greater than the amount of, the weight of the guide rail section.

In connection with the method and arrangement according to this second invention, the additional features/procedures defined elsewhere in this application, e.g. by each of the embodiments presented above and/or by each of the claims, can be used. Particularly advantageous is the use of light ropes, in which case almost total independence from the travel height is achieved.

Some inventive embodiments are also presented in the descriptive section and in the drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments of the invention can be applied within the framework of the basic inventive concept in conjunction with other embodiments. Each embodiment can also singly and separately from the other embodiments form a separate invention.

LIST OF FIGURES

In the following, the invention will be described in detail by the aid of some examples of its embodiments with reference to the attached drawings, wherein FIG. 1 diagrammatically presents an elevator arrangement according to the invention.

DETAILED DESCRIPTION OF THE INVENTION

Figure 1:
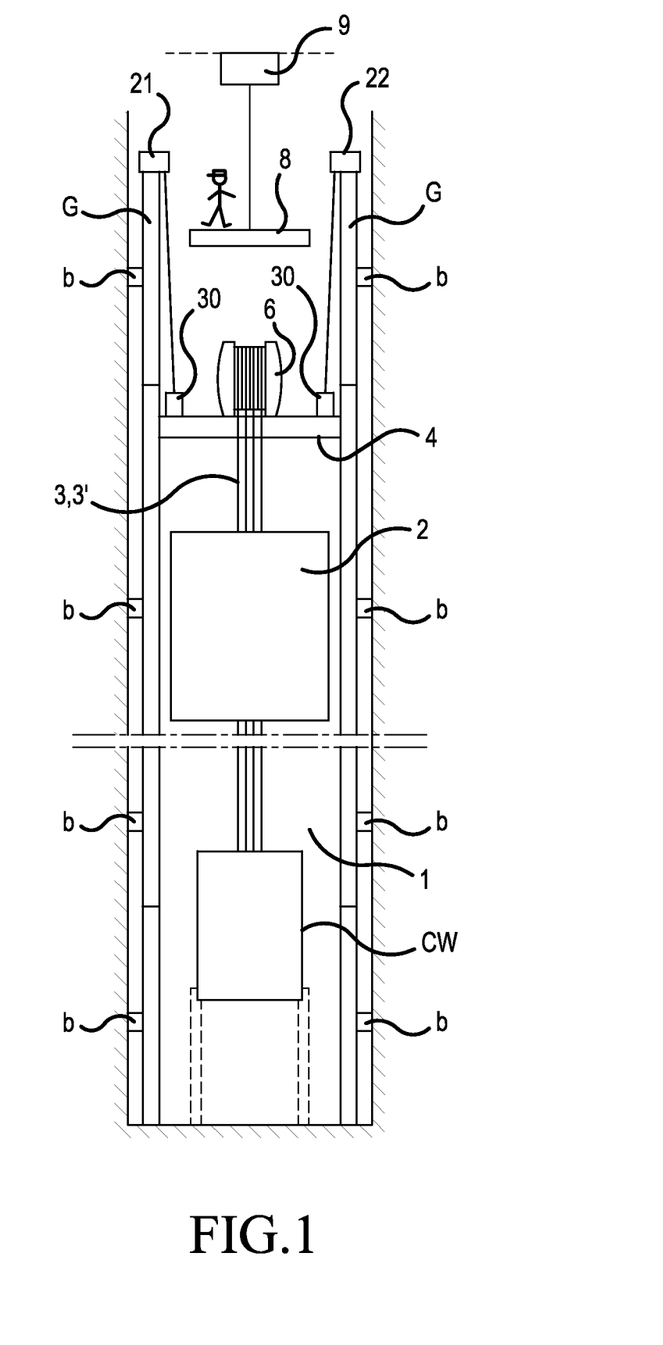

FIG. 1 presents an elevator arrangement according to the invention, which arrangement is achieved by performing the phases of the method according to the invention in the manufacture of the elevator. It presents an arrangement in a phase of the method, in which phase a partially completed elevator is used during the construction-time of the elevator, before the elevator hoistway 1 is completed throughout its full length. The elevator car 3 serves passengers in the already completed bottom part of the elevator hoistway 1 at the same time as the top part of the elevator hoistway above the supporting platform is being built, e.g. from a working platform 8. These work phases preferably include at least installation of the guide rails. The elevator arrangement comprises a movable supporting platform 4 in the elevator hoistway 1 for supporting the elevator car 2 below it via hoisting roping 3,3'. The elevator arrangement comprises means for the vertical support of the supporting platform 4 in its position in the elevator hoistway 1, which means can be moved between a space supporting the supporting platform 4 (supported on the elevator hoistway or on a structure installed in the elevator hoistway) in its position in the vertical direction and a space not supporting the supporting platform 4 in its position in the vertical direction. The hoisting roping 3,3' hangs in the elevator hoistway 1 supported by the supporting platform 4, which hoisting roping can preferably be moved, for moving the elevator car with the traction sheave 6, which is preferably on the supporting platform. The hoisting roping (3,3') comprises one or more ropes (R,R',R",R'"), the longitudinal power transmission capability of which is based at least essentially, preferably wholly, on non-metallic fibers F in the longitudinal direction of the rope. The arrangement additionally comprises means for lifting the supporting platform higher up in the elevator hoistway (21,22,30). In conclusion of the arrangement at least the following procedures of the method are performed. The movable supporting platform 4 and the elevator car 2 are installed in the elevator hoistway 1, the rope installation is performed, in which the elevator is reeved to comprise construction-time hoisting roping (3,3'), and the hoisting roping is arranged to support the car resting on the supporting platform supported in its position above the car. In the aforementioned rope installation the elevator is reeved according to the invention to comprise construction-time roping (3,3'), which comprises one or more ropes (R,R',R", R'"), the longitudinal power transmission capability of which is based at least essentially, preferably wholly, on non-metallic fibers F in the longitudinal direction of the rope. The aforementioned non-metallic fibers F are preferably carbon fibers or glass fibers or Aramid fibers, but they could also be polybenzoxazole fibers such as Zylon fibers (or corresponding) or UHMWPE fibers such as Dyneema fibers (or corresponding). A more detailed preferred structure of the rope(s) of the roping 3,3' is described elsewhere in this application, e.g. in connection with the descriptions of FIGS. 4-6. With the invention the structure and support and hoisting arrangement of the supporting platform 4 can be simplified, because the rope structure presented has numerous multiplier effects on a large part of the structures connected to the supporting platform 4 of a jump-lift. At the same time the maximum height of the elevator to be formed in this way increases. The finding of support points, more particularly the support points of the support arrangement to be arranged above the supporting platform for the lifting of the supporting platform 4, which support arrangement must take support force in the lifting from some stationary structure, is facilitated when the load of the supporting platform 4 can be reduced by lightening the supporting/lifting function. Correspondingly the supporting platform 4 can be locked into its position in the elevator hoistway more freely than before. The support point of the aforementioned support arrangement and/or of the supporting platform to be used for the lifting can also be either a rigid structure of the building and or a guide rail of the elevator. In the preferred embodiment presented by FIG. 1 the support point is a guide rail/guide rails of the elevator, but if desired a rigid structure of the building, such as a concrete wall, metal beams and/or a floor landing, can alternatively be used as a support point. Otherwise the method/arrangement can in this case be as presented in FIG. 1.

More precisely, in the rope installation of the method the elevator arrangement is reeved to comprise construction-time hoisting roping (3,3'), which comprises one or more ropes, which continue(s) via a fixing/fixings 7, which can be opened, to the rope supply storage (11,11'), which rope supply storage comprises a length of rope required by at least one or more jump-lifts. After the reeving the elevator car 2 is taken into use to serve passengers and/or to transport goods, in which use the elevator car is supported and preferably also moved by means of the aforementioned hoisting roping. After this in the method the top parts of the elevator hoistway can be built and when a sufficient level of readiness is reached, the elevator car is removed from the aforementioned use and the service range of the elevator car 2 is changed to reach higher up in the elevator hoistway 1 by lifting the supporting platform higher up in the elevator hoistway. FIG. 1 presents a phase in which this so-called jump-lift can be started. In a jump-lift in the method the supporting platform 4 is lifted preferably taking vertical support force from the guide rails G of the elevator that extend to above the supporting platform, such as from the guide rails (presented only partly with dashed lines) of the car and/or of the counterweight, in which case preferably at least most of, preferably essentially all, the vertical support force needed for lifting is taken from the aforementioned guide rails. This has not earlier been possible in elevators having a very high travel height. With the solution now presented the large load acting on the guide rails can be kept advantageously small and curving of the guide rails under the load is avoided. With a jump-lift the service range of the elevator car is thus changed to reach higher up in the elevator hoistway 1 by moving the supporting platform higher up in the elevator hoistway and by supplying more rope to the hoisting roping (3,3') from the rope supply storage (11,11'). After the lifting of the supporting platform 4 the supporting platform 4 is supported in its position in the elevator hoistway 1 by locking it in the vertical direction, preferably according to the arrangement of FIG. 1, to be supported by the guide rails of the car and/or of the counterweight and/or by their guide rail brackets by fixing it (e.g. to the aforementioned guide rails and/or guide rail brackets) with support means t. After each such jump-lift the elevator car 2 is taken back into the aforementioned use to serve passengers and/or to transport goods, and the structures of the elevator that are above the supporting platform are started to be built, again ending finally in the situation of FIG. 1, in which case a new jump-lift can again be performed. In the method preferably when the supporting platform is lifted, vertical support force is taken from the guide rails G of the elevator that extend to above the supporting platform, which guide rails are on opposite sides of the car 2. In this case preferably before the lifting of the supporting platform the first support arrangement 21 is supported on the top end of the guide rail section of the first guide rail line on the side of the elevator car and the second support arrangement 22 is supported on the top end of the guide rail section of the second guide rail line on the opposite side of the elevator car, which top ends extend to essentially above the supporting platform 4. The support arrangements are preferably separate support structures from each other, leaving space between the support arrangements. An installation platform 8 can thus run between them.

In the lifting the supporting platform 4 is pulled with one or more hoists (the hoist 30 in the figure) to higher up in the elevator hoistway 1 taking the vertical support force needed for the lifting from the guide rails G with the aforementioned support arrangements 21,22. Thus the solution is simple and light. The support arrangements 21,22 can also be moved into position to be supported on the guide rails without a large hoist, or even manually from the working platform 8. In one preferred variation of the method a support arrangement 21,22 being supported on a guide rail is lifted to the level of its support point along with the working platform 8, e.g. by supporting them on the working platform 8 and by moving the working platform. The working platform is moved with a hoist 9 that is above the working platform. Supporting on the guide rails means that there is no need to search for a support point from the other structures of the building. The structure of the roping, for its part, enables the guide rail line to withstand the supporting on them. In this way a so-called "climbing" installation method is achieved, with which method the travel height of an elevator car can be raised with jump-lifts to significantly higher than with prior-art methods, e.g. to over 500 m. The service height of the elevator car is repeatedly increased in the method with a plurality of jump-lifts, in each of which the supporting platform 4 is moved to higher up in the elevator hoistway 1, after each move taking the elevator car 2 into use to serve passengers and/or to transport goods, and when the plurality of jump-lifts has been performed additional installations and/or modifications are performed, with which the construction-time elevator is converted into the final elevator. As a conclusion of the method the construction-time elevator is converted into the final elevator preferably by arranging the hoisting roping to support the elevator car 2 and the counterweight CW with a 1:1 lifting ratio.

The aforementioned guide rails G form a guide rail line/guide rail lines, each of which guide rail lines comprises a plurality of guide rail sections one on top of the other, each guide rail section of which plurality is supported on the building with one or more guide rail brackets b, which aforementioned one guide rail bracket, or the aforementioned more than one guide rail bracket together, is/are arranged to exert upwardly-directed support force on the guide rail section fixed by it for supporting the guide rail section fixed by it, which force is preferably in its magnitude at least most of the weight of the guide rail section, more preferably essentially the amount of, or even greater than the amount of, the weight of the guide rail section. Thus the guide rail brackets b are able to support in the vertical direction at least partly, preferably wholly, the guide rail section fixed by them. In this way the travel height of a jump-lift can be increased to reach very high because thus the dead weight of the guide rail line together with the weight of the arrangements supported on it does not rise to be so great that the guide rail line bends into a curve. A guide rail bracket prevents the guide rail section fixed by it from moving in the lateral direction, but preferably allows its vertical movement if sufficient force is exerted on the guide rail section in the vertical direction. This supporting can be achieved preferably by pressing the guide rail section with a guide rail clamp against the base of the guide rail bracket with a suitable force. If necessary, a part of the support force needed for supporting guide rail sections can be obtained from the guide rail section below the guide rail section in question and possibly finally even from the base of the hoistway. Each elevator unit (elevator car and/or possible counterweight) to be moved under the guidance of the guide rails G comprises a guide shoe (not presented), which takes support in the lateral direction from the guide rails G, and an elevator unit, preferably at least an elevator car, also comprises a safety gear able to grip the guide rails to slow down its speed.

Figure 2:
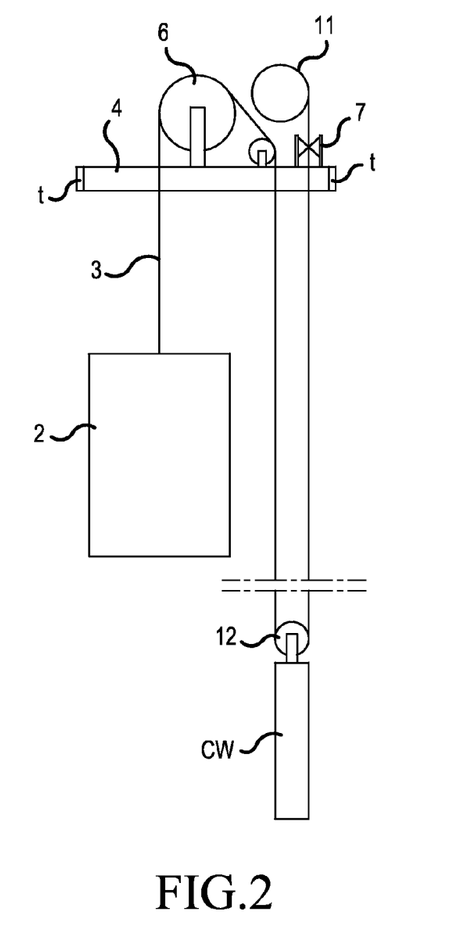
FIG. 2 presents the reeving according to a preferred embodiment of the invention.

FIG. 2 presents a preferred reeving for the construction-time elevator of FIG. 1, with which reeving the elevator car can be moved during the construction time. The rope supply storage 11 is in connection with the supporting platform 4. Owing to the rope structure according to the invention, the rope supply storage can still be moved along with the platform 4 by being supported on the guide rails. It can, of course, alternatively or additionally, be supported also elsewhere. The elevator is reeved with the method to be in this case as presented in the rope installation, i.e. the hoisting roping 3' supports the elevator car with a 1:1 lifting ratio and the counterweight with a 2:1 lifting ratio. In this case preferably the roping 3 rises from the elevator car 2 to the traction sheave 6 and travels downwards to the counterweight, around the diverting pulley 12 comprised in which counterweight the rope passes and rises up to the supporting platform. The centers of rotation of the traction sheave and of the diverting pulley 12 are preferably parallel, in the manner presented, or at a small angle with respect to each other, preferably at an angle of less than 60 degrees, even more preferably at an angle of less than 45 degrees, for enabling belt-type rope solutions.

Figure 3:
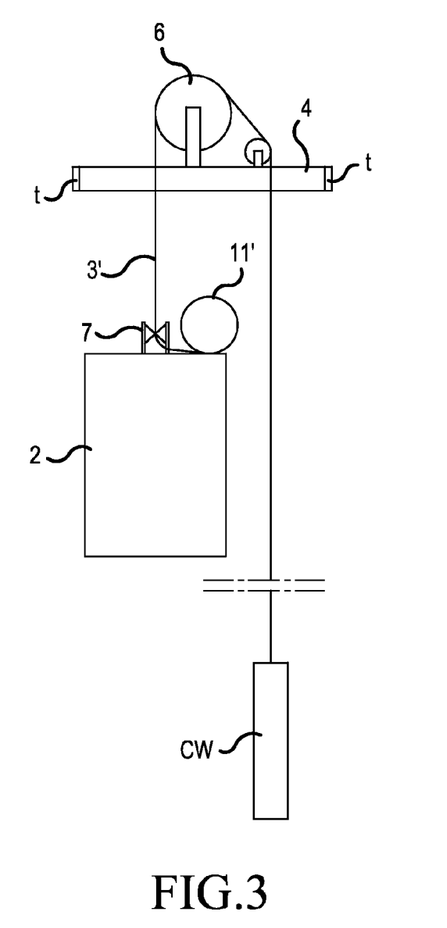
FIG. 3 presents the reeving according to a second preferred embodiment of the invention.

FIG. 3 presents a second preferred reeving for the construction-time elevator of FIG. 1, with which reeving the elevator car can be moved during the construction time. The rope supply storage 11' is in connection with the elevator car 2. Owing to the rope structure according to the invention, the rope supply storage 11' can still be moved along with the elevator car 2. The elevator is reeved with the method to be in this case as presented in the rope installation, i.e. the hoisting roping 3 supports the elevator car with a 1:1 lifting ratio and the counterweight CW with a 1:1 lifting ratio.

An alternative is also that in the aforementioned rope installation the elevator is reeved such that the hoisting roping supports the elevator car with a 2:1 lifting ratio and the counterweight with a 2:1 lifting ratio. Also in this case the rope storage can be arranged in connection with the supporting platform or on a floor landing as presented in the preceding.

In the solution according to the invention the aforementioned non-metallic fibers are most preferably of carbon fiber, glass fiber or Aramid fiber, which are all light fibers. Alternatively, the other aforementioned fibers can also be used. In their material properties the fibers are most preferably of the type, e.g. synthetic fibers, the density of which fibers (F,F') is less than 4000 kg/m3, and the strength is over 1500 N/mm2, more preferably so that the density of the aforementioned fibers (F,F') is less than 4000 kg/m3, and the strength is over 2500 N/mm2, most preferably so that the density of the aforementioned fibers (F,F') is less than 3000 kg/m3, and the strength is over 3000 N/mm2. One advantage is that the fibers are light, and not many of them are needed owing to their great strength. With brittle materials the aforementioned strength is understood to mean breaking strength and with other materials to mean yield strength.

Figure 4A:
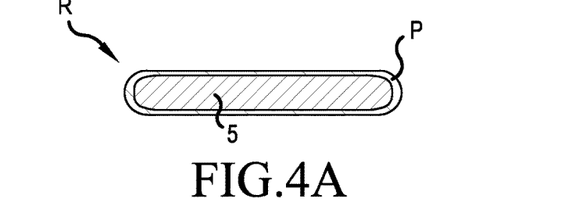
FIGS. 4a-4c present some preferred cross-section alternatives of a preferred embodiment of a rope of the roping of an elevator arrangement according to the invention.
Figure 4B:
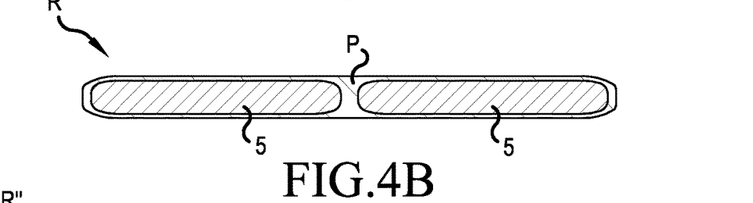
Figure 4C:
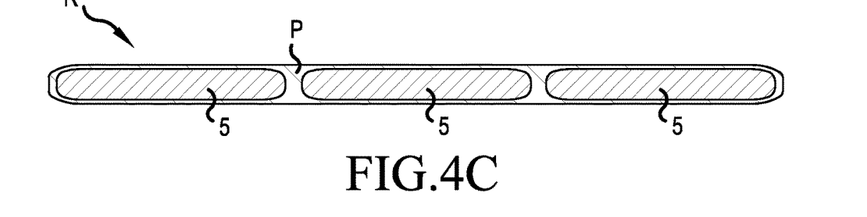
Figure 5:
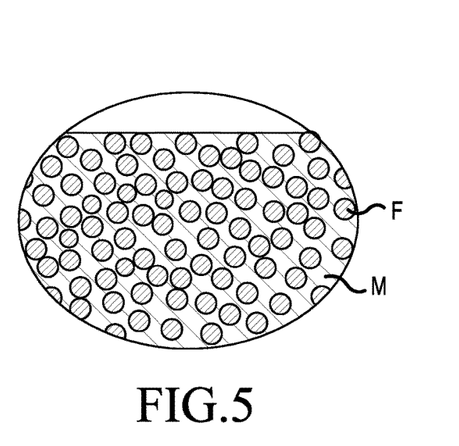
FIG. 5 diagrammatically presents a magnified detail of a cross-section of FIGS. 4a-4c.

FIGS. 4a-5 present the structure of a rope according to one embodiment of the invention. The material of the power transmission part is in this case a composite material, which comprises the aforementioned non-metallic fibers F as reinforcing fibers in a polymer matrix. Thus the power transmission part is light, rigid in the longitudinal direction and when it is belt-shaped it can, however, be bent with a small bending radius. Especially preferably the fibers are carbon fiber or glass fiber, the advantageous properties of which fibers can be seen in the table below. They possess good strength properties and rigidity properties and at the same time they still tolerate very high temperatures, which is important in elevators because poor heat tolerance of the hoisting ropes might cause damage or even ignition of the hoisting ropes, which is a safety risk. Good thermal conductivity also assists the onward transfer of heat due to friction, among other things, and thus reduces the accumulation of heat in the parts of the rope. More particularly the properties of carbon fiber are advantageous in elevator use.

|  |  | Glass fiber | Carbon fiber | Aramid fiber | Steel |
|---|---|---|---|---|---|
| Density | kg/m3 | 2540 | 1820 | 1450 | 7800 |
| Strength | N/mm2 | 3600 | 4500 | 3620 | 500-1900 |
| Rigidity | N/mm2 | 75000 | 200000-600000 | 75000 . . . 120000 | |
| Softening temperature | deg/C. | 850 | >2000 | 450-500, carbonizes | |
| Thermal conductivity | W/mK | 0.8 | 105 | 0.05 | |

The ropes of the roping 3,3' of FIGS. 1-3 are preferably according to any of those presented in FIGS. 4a-4c. As presented in the figures, the rope R,R',R" of the elevator according to the invention is most preferably belt-shaped. Its width/thickness ratio is preferably at least 2 or more, preferably at least 4, even more preferably at least 5 or more, yet even more preferably at least 6, yet even more preferably at least 7 or more, yet even more preferably at least 8 or more, most preferably of all more than 10. In this way a large cross-sectional area for the rope is achieved, the bending capacity of the thickness direction of which is good around the lengthwise axis also with rigid materials of the power transmission part. Additionally, preferably the aforementioned power transmission part 5 or plurality of power transmission parts 5 together cover most of the width of the cross-section of the rope for essentially the whole length of the rope. Preferably the power transmission part(s) 5 thus cover(s) 60% or over, more preferably 65% or over, more preferably 70% or over, more preferably 75% or over, most preferably 80% or over, most preferably 85% or over, of the width of the cross-section of the rope. Thus the power transmission capability of the rope with respect to its total lateral dimensions is good, and the rope does not need to be formed to be thick. This can be simply implemented with any of the aforementioned materials, with which the thinness of the rope is particularly advantageous from the standpoint of, among other things, service life and bending rigidity. When the rope comprises a plurality of power transmission parts 5, the aforementioned plurality of power transmission parts 2 is formed from a plurality of power transmission parts 5 that are parallel in the width direction of the rope and are on at least essentially the same plane. Thus the resistance to bending in their thickness direction is small.

The power transmission part 5 or the aforementioned plurality of power transmission parts 5 of the rope R,R',R" of the elevator according to the invention is preferably fully of non-metallic material. Thus the rope is light. The power transmission parts could, however, if necessary be formed to comprise individual metal wires for another purpose than longitudinal power transmission, for instance in a condition monitoring purpose, but such that their aggregated power transmission capability does not form an essential part of the power transmission capability of the rope. The rope can comprise one power transmission part 5 of the aforementioned type, or a plurality of them, in which case this plurality of power transmission parts 5 is formed from a plurality of parallel power transmission parts 5. This is illustrated in FIGS. 4b-4c. The aforementioned power transmission part 5 singly or plurality of power transmission parts 5 together covers over 40% of the surface area of the cross-section of the rope R,R',R", preferably 50% or over, even more preferably 60% or over, even more preferably 65% or over. In this way a large cross-sectional area is achieved for the power transmission part/parts of the rope, and an advantageous capability for transmitting forces. The width of the aforementioned power transmission part 5 is greater than the thickness. In this case preferably such that the width/thickness of the aforementioned power transmission part 5 is at least 2 or more, preferably at least 3 or more, even more preferably at least 4 or more, yet even more preferably at least 5, most preferably of all more than 5. In this way a large cross-sectional area for the power transmission part/parts is achieved, the bending capacity of the thickness direction of which is good around the lengthwise axis also with rigid materials of the power transmission part. The aforementioned power transmission part 5 or plurality of power transmission parts 5 is surrounded with a coating p in the manner presented in FIGS. 4a-4c, which coating is preferably of polymer, most preferably of polyurethane. Alternatively one power transmission part 5 could form a rope also on its own, with or without a polymer layer p. For facilitating the formation of the power transmission part and for achieving the constant properties in the longitudinal direction it is preferred that the structure of the power transmission part 5 continues essentially the same for the whole length of the rope. For the same reasons, the structure of the rope continues preferably essentially the same for the whole length of the rope. The aforementioned power transmission part 5 is more precisely, in terms of its material, preferably of the following type. It is a non-metallic composite, which comprises non-metallic reinforcing fibers, preferably carbon fibers, glass fibers or Aramid fibers, more preferably carbon fibers or glass fibers in a polymer matrix M, but also other aforementioned fibers can be used. The power transmission part 5 with its fibers is longitudinal to the rope, for which reason the rope retains its structure when bending. Individual fibers F are thus oriented in the longitudinal direction of the rope. In this case the fibers are aligned with the force when the rope is pulled. The aforementioned reinforcing fibers F are bound into a uniform power transmission part with the aforementioned polymer matrix M. Thus the aforementioned power transmission part 5 is one solid elongated rod-like piece. The aforementioned reinforcing fibers are preferably long continuous fibers longitudinal to the rope, which fibers preferably continue for the distance of the whole length of the rope. Preferably as many fibers as possible, most preferably essentially all the fibers of the aforementioned power transmission part are longitudinal to the rope, preferably essentially unentwined with relation to each other. Thus the structure of the power transmission part can be made to continue the same as far as possible in terms of its cross-section for the whole length of the rope. The aforementioned reinforcing fibers are distributed in the aforementioned power transmission part as evenly as possible, so that the power transmission part would be as homogeneous as possible in the transverse direction of the rope. The bending direction of the rope is around the width direction of the rope (up or down in the figure). As presented in FIGS. 4a-c, each aforementioned power transmission part 5 is surrounded with a polymer layer p, which is preferably of elastomer, most preferably of high-friction elastomer, such as preferably of polyurethane, which layer forms the surface of the rope. An advantage of the structure presented is that the matrix M surrounding the reinforcing fibers keeps the interpositioning of the reinforcing fibers essentially unchanged. It equalizes with its slight elasticity the distribution of a force exerted on the fibers, reduces fiber-fiber contacts and internal wear of the rope, thus improving the service life of the rope. The reinforcing fibers can be glass fibers, in which case good electrical insulation and an inexpensive price, among other things, are achieved. Alternatively the reinforcing fibers can be of carbon fiber, with which good tensile rigidity and a light structure and good thermal properties, among other things, are achieved. In this case also the tensile rigidity of the rope is slightly lower, so that traction sheaves of small diameter can be used. The composite matrix, into which the individual fibers are distributed as evenly as possible, is most preferably epoxy resin, which has good adhesiveness to the reinforcements and which is strong to behave advantageously at least with glass fiber and carbon fiber. Alternatively, e.g. polyester or vinyl ester can be used. FIG. 5 presents a preferred internal structure for a power transmission part 5. A partial cross-section of the surface structure of the power transmission part 5 (as viewed in the longitudinal direction of the rope) is presented inside the circle in the figure, according to which cross-section the reinforcing fibers of the power transmission parts presented elsewhere in this application are preferably in a polymer matrix. The figure presents how the reinforcing fibers F are essentially evenly distributed in the polymer matrix M, which surrounds the fibers and is fixed to the fibers. The polymer matrix M fills the areas between individual reinforcing fibers F and binds essentially all the reinforcing fibers F that are inside the matrix M to each other as a uniform solid substance. In this case abrasive movement between the reinforcing fibers F and abrasive movement between the reinforcing fibers F and the matrix M are essentially prevented. A chemical bond exists between, preferably all, the individual reinforcing fibers F and the matrix M, one advantage of which is, among others, uniformity of the structure. To strengthen the chemical bond, there can be, but not necessarily, a coating (not presented) of the actual fibers between the reinforcing fibers and the polymer matrix M. The polymer matrix M is of the kind described elsewhere in this application and can thus comprise additives for fine-tuning the properties of the matrix as an addition to the base polymer. The polymer matrix M is preferably of a hard non-elastomer. The reinforcing fibers being in the polymer matrix means here that in the invention the individual reinforcing fibers are bound to each other with a polymer matrix e.g. in the manufacturing phase by embedding them together in the molten material of the polymer matrix. In this case the gaps of individual reinforcing fibers bound to each other with the polymer matrix comprise the polymer of the matrix. Thus in the invention preferably a large amount of reinforcing fibers bound to each other in the longitudinal direction of the rope are distributed in the polymer matrix. The reinforcing fibers are preferably distributed essentially evenly in the polymer matrix such that the power transmission part is as homogeneous as possible when viewed in the direction of the cross-section of the rope. In other words, the fiber density in the cross-section of the power transmission part does not therefore vary greatly. The reinforcing fibers together with the matrix form a uniform power transmission part, inside which abrasive relative movement does not occur when the rope is bent. The individual reinforcing fibers of the power transmission part are mainly surrounded with polymer matrix, but fiber-fiber contacts can occur in places because controlling the position of the fibers in relation to each other in their simultaneous impregnation with polymer matrix is difficult, and on the other hand totally perfect elimination of random fiber-fiber contacts is not wholly necessary from the viewpoint of the functioning of the invention. If, however, it is desired to reduce their random occurrence, the individual reinforcing fibers can be pre-coated such that a polymer coating is around them already before the binding of individual reinforcing fibers to each other. In the invention the individual reinforcing fibers of the power transmission part can comprise material of the polymer matrix around them such that the polymer matrix is immediately against the reinforcing fiber but alternatively a thin coating, e.g. a primer arranged on the surface of the reinforcing fiber in the manufacturing phase to improve chemical adhesion to the matrix material, can be in between. Individual reinforcing fibers are distributed evenly in the power transmission part such that the gaps of individual reinforcing fibers comprise the polymer of the matrix. Preferably the majority, most preferably essentially all of the gaps of the individual reinforcing fibers in the power transmission part are filled with the polymer of the matrix. The matrix of the power transmission part is most preferably hard in its material properties. A hard matrix helps to support the reinforcing fibers, especially when the rope bends, preventing buckling of the reinforcing fibers of the bent rope, because the hard material supports the fibers. To reduce the bending radius of the rope, among other things, it is therefore preferred that the polymer matrix is hard, and therefore preferably something other than an elastomer (an example of an elastomer: rubber) or something else that behaves very elastically or gives way. The most preferred materials are epoxy resin, polyester, phenolic plastic and vinyl ester. The polymer matrix is preferably so hard that its module of elasticity (E) is over 2 GPa, most preferably over 2.5 GPa. In this case the module of elasticity (E) is preferably in the range 2.5-10 GPa, most preferably in the range 2.5-3.5 GPa. Preferably over 50% of the surface area of the cross-section of the power transmission part is of the aforementioned reinforcing fiber, preferably such that 50%-80% is of the aforementioned reinforcing fiber, more preferably such that 55%-70% is of the aforementioned reinforcing fiber, and essentially all the remaining surface area is of polymer matrix. Most preferably such that approx. 60% of the surface area is reinforcing fiber and approx. 40% is matrix material (preferably epoxy). In this way a good longitudinal strength of the rope is achieved. When the power transmission part is of a composite comprising non-metallic reinforcing fibers the aforementioned power transmission part is a uniform, elongated, rigid piece. One advantage, among others, is that it returns to its shape from a bent position to be straight. The aforementioned fibers F are at least essentially longitudinal to the rope, preferably as longitudinal as possible and essentially unentwined with each other. Although the rope of the invention is preferably belt-shaped, its internal structure could also be utilized with other cross-sectional shapes of ropes.

Figure 6:
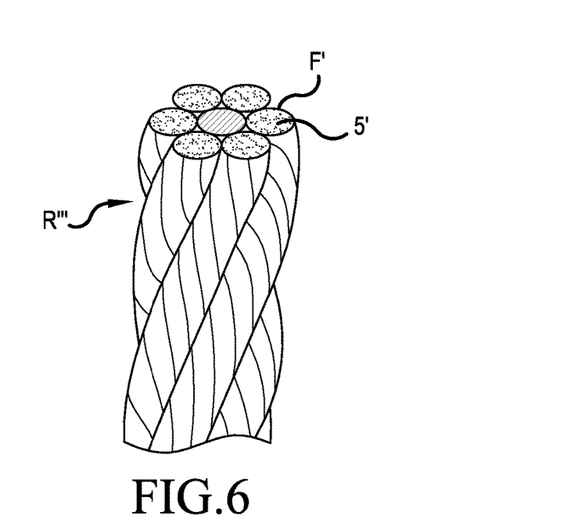
FIG. 6 presents a three-dimensional view of a preferred embodiment of a rope of the roping of an elevator arrangement according to the invention.

FIG. 6 presents a second preferred rope structure for using in the roping 3 or 3' of FIGS. 1 and/or 2 and/or 3. As presented in this embodiment the rope R'" comprises a power transmission part 5', more precisely a plurality of power transmission parts 5' (in the figure, 5 units circling the center rope), for transmitting force in the longitudinal direction of the rope, which power transmission part 5' comprises one or more strands braided from any of the aforementioned non-metallic fibers, preferably a strand braided from Aramid fibers F'. The power transmission part 5' can thus itself be a braided strand or can comprise a plurality of braided strands. The advantage is a light structure, which enables supple behavior of the rope and bending in different directions. The power transmission part 5' is essentially fully of non-metallic material. The rope R'" is round in its cross-section. The power transmission parts 5' are wrapped around a center rope, which center rope can be a wire or braid. Instead of a round cross-section the rope R'" could alternatively be bound to other corresponding ropes R'", e.g. with an elastic material, such as with rubber, polyurethane or corresponding material, such that the end result is a belt-shaped entity. The rope R'" of also this embodiment is preferably essentially fully of non-metallic material. If required, however, the center rope can be formed from some other material than that presented. In this case also, however, the longitudinal power transmission capability of the rope is based at least essentially on the aforementioned non-metallic fibers F' in the longitudinal direction of the rope. The fibers of this rope also are preferably long continuous fibers in the longitudinal direction of the rope, which fibers preferably continue for the distance of the whole length of the rope.

In this application the term longitudinal fibers of the rope refers to fibers that are at least essentially longitudinal to the rope. In this case the longitudinal pulling of the rope is transmitted into the fibers as longitudinal pulling of the fiber. They can be essentially unentwined with each other (e.g. the fibers F of the part 5) or entwined with each other (e.g. the fibers F' of the part 5').

Longitudinal force can be transmitted with the rope, which transmission capability is based in the invention at least essentially on the longitudinal fibers F,F' of the rope. The individual fibers withstand without breaking the longitudinal pulling exerted on them, which pulling is produced from the longitudinal pulling of the rope, and are thus able to transmit a certain amount of the force in their longitudinal direction. The longitudinal power transmission capabilities of these individual fibers together form at least essentially, or even wholly, the longitudinal power transmission capability of the rope, by means of which power transmission capability e.g. a load can be supported with the rope.

Although lifting with the method and with the arrangement is performed by supporting on the guide rails, the invention also facilitates finding of support in other types of solutions and can thus be applied also in hoisting arrangements in which the support of the lifting is taken directly from the walls of the elevator hoistway and/or from floor landings, of cetera. The elevator to be achieved with the method and with the arrangement is preferably an elevator to be permanently installed in a building, the elevator car of which elevator is preferably movable in the vertical direction, preferably movable inside a building, such as for instance a high-rise tower, in an elevator hoistway, at least on the basis of car calls and/or landing calls. The interior space of the elevator car is most preferably suited to receive a passenger or a number of passengers. The elevator preferably comprises at least two, preferably more, floors to be served. It is obvious to the person skilled in the art that the invention is not limited to the embodiments described above, in which the invention is described using examples, but that many adaptations and different embodiments of the invention are possible within the frameworks of the inventive concept defined by the claims presented below. The roping according to the invention preferably comprises only ropes based on non-metallic fibers in their longitudinal power transmitting capability in the manner described above, but it is obvious that the roping can also comprise, if necessary, other types of ropes.

The invention claimed is:

1. A method in the manufacture of an elevator, comprising the steps of:
installing a movable, supporting platform and an elevator car in an elevator hoistway;
performing a rope installation wherein the elevator is reeved to comprise construction-time hoisting roping, and the construction-time hoisting roping is arranged to support the elevator car from the supporting platform supported above the elevator car;
taking the elevator car into use to serve passengers and/or to transport goods;
removing the elevator car from use;
changing a service range of the elevator car to reach higher up in the elevator hoistway by lifting the supporting platform higher up in the elevator hoistway; and
taking the elevator car back into use,
wherein, in the rope installation, the construction-time roping comprises one or more ropes, a longitudinal power transmission capability of which is based essentially on non-metallic fibers in a longitudinal direction of the rope,
wherein, in the method, the supporting platform is lifted taking a vertical support force from guide rails of the elevator that extend to above the supporting platform, wherein at least most of the vertical support force needed for lifting is taken from the guide rails,
wherein, before the lifting of the supporting platform, a first support arrangement is supported on a top most surface of a top end of a guide rail section of a first guide rail line of the guide rails on a side of the elevator car and a second support arrangement is supported on a top most surface of a top end of a guide rail section of a second guide rail line of the guide rails on an opposite side of the elevator car, which top ends extend essentially to above the supporting platform, and, in the lifting of the supporting, the supporting platform is pulled with first and second hoists associated with the first and second support arrangements, respectively, to higher up in the elevator hoistway taking the vertical support force needed for the lifting from the guide rails with the first and second support arrangements,
wherein the first and second support arrangements are provided separately so as to not be directly connected to each other, and
wherein the first and second hoists extend only to the first and second support arrangements, respectively.

2. The method according to claim 1, wherein in the rope installation the elevator is reeved to comprise the construction-time hoisting roping, which comprises one or more ropes, which extends via a fixing/fixings to a rope supply storage, which rope supply storage comprises a length of rope required by at least one or more jump-lifts.

3. The method according to claim 2, wherein the rope supply storage is in connection with the elevator car or in connection with the supporting platform.

4. The method according to claim 1, wherein the service range of the elevator car is changed to reach higher up in the elevator hoistway by moving the supporting platform higher up in the elevator hoistway and by supplying more rope to the hoisting roping from a rope supply storage.

5. The method according to claim 1, wherein after the lifting of the supporting platform, the supporting platform is supported in the elevator hoistway by locking it in a vertical direction to be supported by the guide rails of the car.

6. The method according to claim 1, wherein the topmost surface of the top end of the guide rail section of the first guide rail line is a horizontal surface of the guide rail section when the guide rail section is installed in the elevator hoistway, and
wherein the topmost surface of the top end of the guide rail section of the second guide rail line is a horizontal surface of the guide rail section when the guide rail section is installed in the elevator hoistway.

7. The method according to claim 1, wherein no portion of the first guide rail line extends above the first support arrangement when the first support arrangement is mounted to the first guide rail line in the elevator hoistway, and
wherein no portion of the second guide rail line extends above the second support arrangement when the second support arrangement is mounted to the second guide rail line in the elevator hoistway.

8. Elevator system, comprising:
an elevator hoistway;
an elevator car;
hoisting roping for supporting and moving the elevator car in the elevator hoistway;
a hoisting machine for moving the hoisting roping;
a movable, supporting platform for supporting the elevator car below the supporting platform in the elevator hoistway via the hoisting roping;
first and second support arrangements for assisting in the lifting of the supporting platform higher up in the elevator hoistway;
first and second guide rail lines located in the elevator hoistway;
first and second hoists associated with the first and second support arrangements, respectively; and
a supporting device configured to vertically support the supporting platform in the elevator hoistway,
wherein the hoisting roping comprises one or more ropes, a longitudinal power transmission capacity of which is based essentially on non-metallic fibers in a longitudinal direction of the rope,
wherein each of the first and second guide rail lines comprises a plurality of guide rail sections one on top of the other, each guide rail section of which plurality is supported on the building with one or more guide rail brackets,
wherein the first support arrangement is supported on a top most surface of a top end of a guide rail section of the first guide rail line on a side of the elevator car and the second support arrangement is supported on a top most surface of a top end of a guide rail section of the guide rail line on an opposite side of the elevator car,
wherein the first and second support arrangements are provided separately so as to not be directly connected to each other, and
wherein the first and second hoists extend only to the first and second support arrangements, respectively.

9. The elevator system according to claim 8, wherein the rope comprises a power transmission part or a plurality of power transmission parts, for transmitting a force in the longitudinal direction of the rope, which power transmission part is formed only of non-metallic material.

10. The elevator system according to claim 9, wherein the power transmission part or plurality of power transmission parts continues from the elevator car at least to the traction sheave and the rope is arranged to transmit with the power transmission part or plurality of power transmission parts the longitudinal force of the rope from the traction sheave to the elevator car for supporting and moving the elevator car.

11. The elevator system according to claim 9, wherein essentially all the power transmission parts of the rope for transmitting force in the longitudinal direction of the rope are formed only of non-metallic material.

12. The elevator system according to claim 9, wherein the material of the power transmission part is a composite material, which comprises non-metallic fibers as reinforcing fibers in a polymer matrix.

13. The elevator system according to claim 8, wherein the rope comprises a power transmission part or a plurality of power transmission parts, for transmitting a force in the longitudinal direction of the rope, which power transmission parts comprises the non-metallic longitudinal fibers in the longitudinal direction of the rope.

14. The elevator system according to claim 8, wherein the power transmission part or plurality of power transmission parts continues from the elevator car at least to the supporting platform and the rope is arranged to transmit with the power transmission part or plurality of power transmission parts the longitudinal force of the rope from the supporting platform to the elevator car for supporting the elevator car.

15. The elevator system according to claim 8, wherein the non-metallic fibers are carbon fibers or glass fibers or Aramid fibers or polybenzoxazole fibers or UHMWPE fibers.

16. The elevator system according to claim 8, wherein the non-metallic fibers are synthetic fibers.

17. The elevator system according to claim 8, wherein the rope comprises a power transmission part or a plurality of power transmission parts, for transmitting force in the longitudinal direction of the rope, which power transmission part comprises one or more strands braided from the non-metallic fibers.

18. The elevator system according to claim 8, wherein a density of the fibers is less than 4000 kg/m3.

19. The elevator system according to claim 8, wherein, between jump-lifts, the installation work of the elevator is performed from a movable working platform above the supporting platform, and the first and second support arrangements are lifted along with the working platform to the level of its support point, and the first and second support arrangements are supported in the vertical direction in their position in the elevator hoistway, and the supporting platform is lifted taking a vertical support force from the first and second support arrangements from the structure on which the first and second support arrangements are supported.

20. The elevator system according to claim 8, wherein the topmost surface of the top end of the guide rail section of the first guide rail line is a horizontal surface of the guide rail section when the guide rail section is installed in the elevator hoistway, and wherein the topmost surface of the top end of the guide rail section of the second guide rail line is a horizontal surface of the guide rail section when the guide rail section is installed in the elevator hoistway.

21. The elevator system according to claim 8, wherein no portion of the first guide rail line extends above the first support arrangement when the first support arrangement is mounted to the first guide rail line in the elevator hoistway, and wherein no portion of the second guide rail line extends above the second support arrangement when the second support arrangement is mounted to the second guide rail line in the elevator hoistway.

* * * * *